June 16, 1942.  I. SORS  2,286,239
LUMINOUS TUBE
Filed March 25, 1939
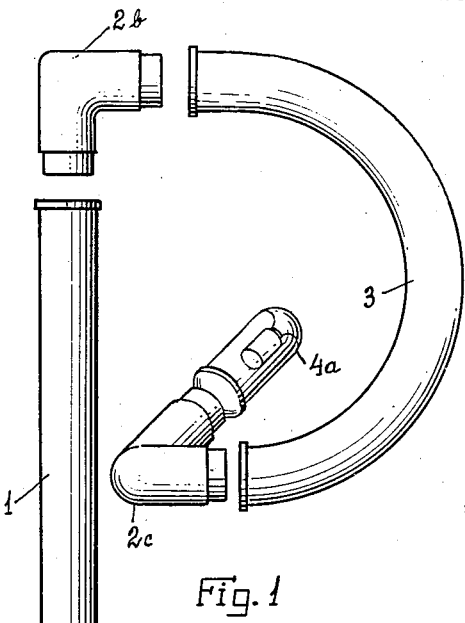
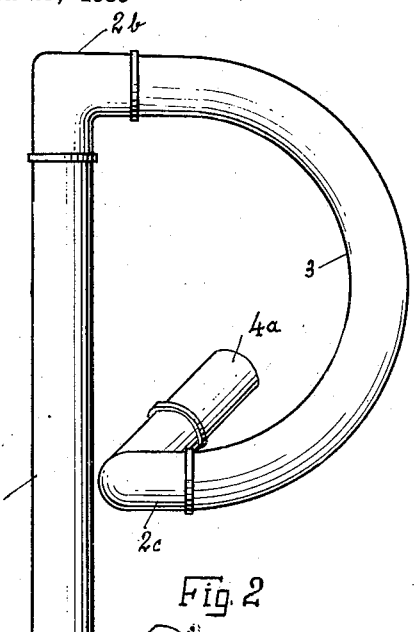
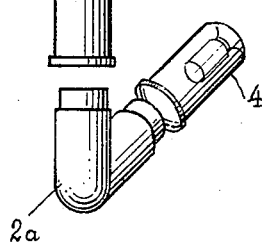
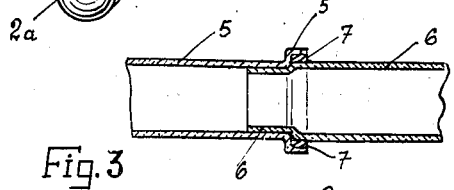
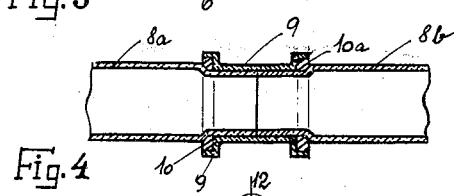
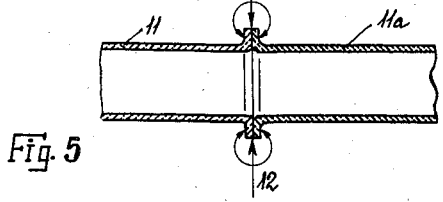
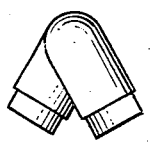
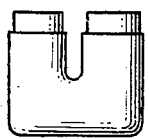
Inventor
Imre Sors
Attorney Patented June 16, 1942

2,286,239

UNITED STATES PATENT OFFICE 2,286,239

LUMINOUS TUBE

Imre Sors, Budapest, Hungary

Application March 25, 1939, Serial No. 264,240
In Hungary September 15, 1938

4 Claims. (Cl. 176—122)

This invention relates to the manufacture of electrical discharge tubes, particularly those for advertisement and decoration purposes, so-called neon-luminous tubes. The manufacture costs of such tubes consist to their greatest part in the costs of the glass-technical processes by which the tubes are brought to the shapes required. These costs are relatively high, as the shaping of different luminous signs, e. g. letters of glass tubes requires high skilled and careful work. The splicing and bending itself, as well as the preparatory work, involve much time. Consequently, the cost of production is high. Further, the spots worked, e. g. spliced, may become sources of defects. The exchange of defective glass letters or other forms of tubes is very expensive too.

By means of glass-technical processes used up to the present the production of such glass letters or other signs which are formed and/or connected with each other by glass-splicing and which are to be covered with a luminescent or fluorescent layer is impossible, as the layer clears off from the wall of the glass tube on the spot of the splicing and by this the luminous column becomes interrupted.

Finally, the processes presently used are not suitable for the production of glass tubes and letters of large mass or of big size.

An object of the present invention is to reduce the costs of the glass-working processes by enabling the use of machines and mechanisms. By this means the production of damaged goods may be considerably reduced or totally avoided and generally no costs and waste of time for their substitution are required. A further object of the invention is to enable the manufacture of luminous tubes covered with luminescent or fluorescent layers.

The essential feature of the present invention is that the several parts or sections of the glass tubes are connected with one another by fittings, instead of the glass-technical processes previously used. In this way, it is now possible to make the tubes by suitable mechanisms or machines.

According to the invention the luminous signs are constituted by individual sections or parts, these latter having on their ends surfaces of their own material adapted for mechanical fitting. For the connection of the profiled parts, I use connecting parts or fittings having a shape of angle, arch, U and the like, such as shown in Figs. 6, 7, 8 and 9 of the accompanying drawing. The ends of these connecting parts are also adapted for mechanical fitting as there shown. They may also be produced by known machining methods, e. g. by pressing.

On the fitting surfaces of the profiled parts and of the connecting parts having shapes of an angle, arch, U and the like, a layer of glass-enamel or the like may be formed in order to obtain a vacuum-proof and steady tightening. This material must be applied to the fitting surfaces in a proper way. This can be carried out for example by dissolving the basic material e. g. in alcohol or in some other easily evaporable solvent and by spreading the resulting paste on the fitting surfaces. Another way for applying the packing material onto the fitting surfaces consists in pressing rings of the basic material, e. g. glass enamel after mixing it with a suitable substance, e. g. paraffin and placing these rings around the surfaces to be fitted.

Thus, the luminous sign or the like is fitted by the corresponding profiled parts and connecting parts, the packing material is applied onto the fitting surfaces and after these proceedings the whole luminous sign is heated. By the heat the glass enamel or the like material is dissolved and consequently a vacuum proof, steady packing, coherent with the material of the glass tube will be obtained. Thereafter, the temperature is reduced to the evacuating temperature, the tube is evacuated by known process and filled with the necessary gases.

The profiled and connecting parts may be fitted also without the use of packing or tightening means or substances by splicing by mechanical means, in which case the heat is applied to the surfaces to be fitted or connected with another. By the heat the glass of the tube parts is molten and when pressure is applied by a suitable construction of the apparatus to the spots to be connected, the tightening may be obtained without packing means.

The drawing illustrates certain embodiments of this invention, such embodiments being more fully described hereinafter with reference to the several figures of the drawing.

Figure 1 shows the profiled and connecting parts of a letter "P" made of glass before their fitting. The straight section 1 is to be connected with the rectangular connecting parts 2a, 2b, the rectangular parts 2a, 2c with the electrodes 4, 4a and the connecting parts 2b, 2c are to be connected with the arch-shaped piece 3, which latter is bended by mechanical means.

Figure 2 shows the same luminous sign in fitted state, that is, in the finished form or letter.

Figure 3 is an embodiment of the fitting itself. The tube ends 5, 6 are provided with surfaces adapted for mechanical fitting, the vacuum proof packing being provided by the layer 7 made of one of the above mentioned substances and applied on the fitting surface in a manner already described.

Figure 4 shows another way of fitting and packing, 8 and 8a are tube-endings of similar construction, 9 designates a connecting piece and 10, 10 is the above mentioned vacuum proof packing.

Figure 5 shows another way of fitting where the ends of the tubes 11, 11 are plate-like shaped. The fitting surfaces 12 are connected by heating and splicing with a suitable device. In this case no packing material is to be used.

Figures 6, 7, 8, 9 show different forms of connecting pieces or fittings, useful in joining profiled parts as described ante.

As shown in the several figures and as described ante, the present invention may be practiced in various ways.

In general, my new and improved luminous signs and tubes are shaped, continuous electrical discharge tubes of glass formed of individual profiled glass sections joined together with intermediate glass fittings, the said sections and fittings being so joined as to form gas tight joints and a continuous discharge tube of glass having the desired shape, as illustrated in Fig. 2 of the drawings.

In my improved processes of making such luminous signs, I separately form the individaul profiled glass sections and the intermediate glass fittings and then join the profiled sections with the intermediate fittings to produce continuous electrical discharge tubes of glass having the shape desired in such luminous sign or letter, as shown in Figs. 1 and 2; the said sections and fittings being so joined as to form gas tight joints, as described ante. My improved methods and the improved composite tubes so obtained have several advantages as shown ante.

What I claim is:

1. In luminous signs having gas filled tubes, a shaped, continuous electrical discharge tube of glass formed of individual profiled tubular glass sections joined together with intermediate tubular glass fittings, the said profiled sections and fittings being so joined as to form gas tight joints and a shaped continuous discharge tube of glass and being so arranged relative to each other as to give the desired shape to the continuous tube so formed, and said shaped, continuous tube containing in the visible, luminous portion thereof at least one of said glass fittings.

2. In a process of making luminous signs, the steps which comprise separately forming individual profiled tubular glass sections and intermediate tubular glass fittings and joining the profiled sections with the intermediate fittings to form a continuous electrical discharge tube of glass having the shape desired in such luminous sign, the said profiled sections and fittings being so joined as to form gas tight joints.

3. The process of claim 2 wherein a glass-enamel is applied to the ends of said sections and fittings to be joined together, the glass-enamel being so applied as to form a layer between the contacting surfaces of the said sections and fittings and subsequently heating the so assembled continuous electrical discharge tube to melt said layer, whereby sealing said joints with a fused transparent layer of glass-enamel of coherently combined with said contacting surfaces.

4. The process of claim 2 wherein the said sections and fittings are joined by heating the ends thereof and then pressing the heated ends together to fuse the contacting surfaces into a unitary, sealed, gas tight joint.

IMRE SORS.